Aug. 8, 1950   J. F. McWHORTER ET AL   2,517,799
PROCESS OF EXTRUDING NONPLASTIC MATERIALS
Filed March 1, 1947

INVENTORS
JOHN F. McWHORTER AND
BY MAHLON J. RENTSCHLER

Oberlin & Limbach
ATTORNEYS.

Patented Aug. 8, 1950

2,517,799

UNITED STATES PATENT OFFICE 2,517,799

PROCESS OF EXTRUDING NONPLASTIC MATERIALS

John F. McWhorter, Cleveland Heights, and Mahlon J. Rentschler, Willoughby, Ohio, assignors, by mesne assignments, to The Ohio Rubber Company, Willoughby, Ohio, a corporation of Delaware Application March 1, 1947, Serial No. 731,804

8 Claims. (Cl. 18—55)

1

Forming articles by extrusion molding has not only the advantage of producing shapes in extended lengths, but also certain mechanical advantages such as go with continuous type operations. However, the materials amenable to extrusion molding are limited; and many other materials in which rapid and low-cost molding would be desirable are excluded from this type of operation. Thus, non-plastic materials in a state of division, such as fibrous materials, non-plastic clays, mineral residues, fines and concentrates, oxides, etc., are normally excluded from this field of operation. We have now found, however, that by suitable treatment, fibrous materials and other non-plastic materials as afore-noted can be shaped with the advantages of operation by extrusion molding. Other objects and advantages of the invention will be apparent from the following description.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

Figure 1:
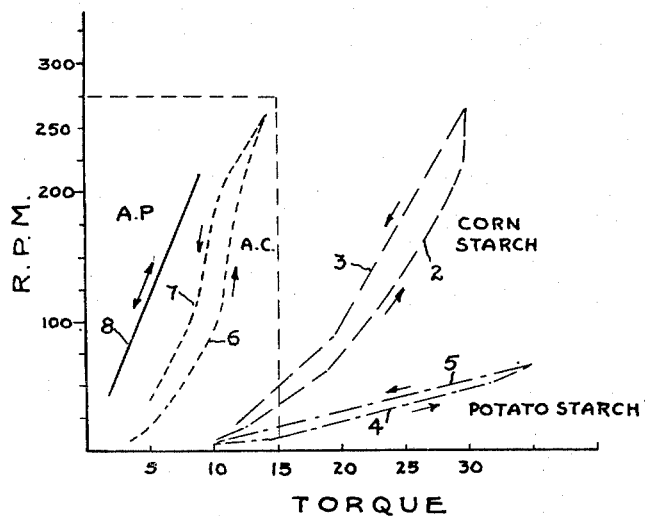
Fig. 1 represents a graph, showing properties of certain materials.
Figure 2:
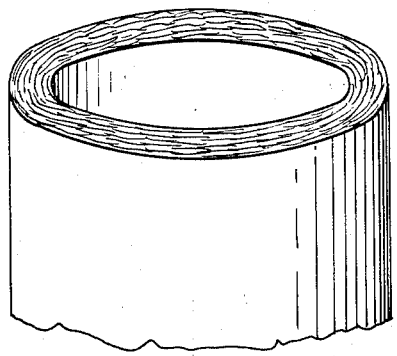
Fig. 2 is a fragmentary perspective view showing the end of a section of a tubular product molded in accordance with the invention.

In dealing with materials which are primarily of non-plastic character, in accordance with our invention the first feature of the procedure is to disseminate in the material an extrusion flow-promoting agent, as it may be designated for conciseness. This material involves certain properties affecting the flowability of the material to be molded. It does not involve a mere surface lubricating action, but rather a comprehensive change in internal forces with cohesion so much greater than adhesion that the mass compacts and rides smoothly past the die surfaces without scuffing, breaking or cracking, and the internal viscosity and the surface tension are sufficiently low for efficient flow, and the extruded products have a finished smooth surface.

As known from the principles of physical chemistry, substances which form a gel are divisible into two general classes, those which change on agitation or pressure, such that the gel structure thins or disappears, and those which are

2 able to withstand agitation or pressure without thinning or losing the gel structure. The first-mentioned class are thixotropic substances, and the second-mentioned class are non-thixotropic substances. In extrusion molding, the pressure and stress introduced into the mass is considerable, and substances of the thixotropic type break down. We have found that if substantially non-thixotropic material in suitable amount be incorporated into non-plastic materials, extrusion molding becomes feasible. As illustrating the character of properties which determine whether an agent may be suitable for promoting the extrusion flow in otherwise non-plastic material, we have found that measurement of certain characteristics of the materials shows why some are operable for promotion of extrusion flow, while others are not, and an agent to be suitable for this purpose must have certain ascertainable properties. Thus, taking measurements of torque in relation to revolutions per minute as by means of a rotational viscosimeter, and plotting into curves, certain characteristics are clearly to be seen. The general form of rotational viscosimeters is well-known, having been referred to variously in chemical literature, for instance in Ind. Chem. Anal. Ed. XIII, 632; XV, 201. As well known, natural starch when made up with water and heated, forms a gel, a familiar example being "blanc mange" dessert, a solid mass which, however, is easily broken apart. Modified starch, on the other hand, as cold-swelling starch or hydrolyzed starch prepared by treating natural starch with a hydrolyzing agent, e. g. alkali, however, does not have such break-down character, but can be drawn out in stringy form. And it is substantially non-thixotropic.

With natural cornstarch made up in the amount of 5 per cent with water as for laundry use with heat, as necessary, tested in a rotational viscosimeter, the curve of increase in torque with increase of R. P. M. is of the general character shown at 2, Fig. 1; then as the rotational speed is slowed back down, the curve of torque with reference to the R. P. M. is of the general form at 3, Fig. 1. That is, the starch structure has undergone a change by reason of the stress to which it has been subjected in the rotational movement of the rotor in the device, and this partial breakdown results in the wide spread between the curve of increase of rotation and the curve of decrease; and of particular importance it is noticed that the torque in general goes to a high range, far above that produced by 15 pounds air pressure or "15" as designated on the graph.

(In this scale, 5, 10, 15, 20, 25 and 30 correspond respectively to .03, .065, .095, .135, .160, and .195 pound-inches instrument measurement.) If potato starch similarly be made up in 5 per cent concentration with water and subjected to the same test, again this shows a pronounced increase in torque far beyond that produced by 15 pounds air pressure, and the plotted curve 4 of increase of rotation and the curve 5 of decrease are separated in accordance with the amount of change in the material. This thixotropic change taken in conjunction with the very high torque developed is thus characteristic of such substances as natural starches; and gelatin and India gum, etc., show similar general characteristics. If on the other hand, however, a starch which has been hydrolyzed, as for instance by alkali, be similarly made up in 5 per cent concentration in water, such starch being of the cold swelling type, test with the rotational viscosimeter shows a very different curve, viz. the curve is steep, in contrast to the long slope curve of natural starches, and the entire curve falls well within the limits of 15 pounds torque. Thus, the hydrolyzed cornstarch forms a curve on the order of AC, Fig. 1, with ascending slope 6 and descending slope 7; and while there is some spread between the ascending and descending curves, the total curve or torque rise in relation to speed of rotation falls well within the 15-pound line; or in other words, such material does not show great viscosity and resistance drag on surfaces. Potato starch, hydrolyzed as by alkali, similarly made up in 5 per cent concentration, tested on the rotational viscosimeter, shows even less torque development, less than 10 pounds, and the dotted curve 8, Fig. 1, is identical in increasing and decreasing rotational speed. In general, the physical properties of low torque development, i. e. under 15 pounds in rotational viscosimeter test, and low thixotropy or preferably absence of thixotropy form the characteristics of material which we find has the property when disseminated in non-plastic divided material, of rendering it extrusion-moldable. For example, non-plastic clay, shale, and the like, with an addition of around 5 per cent of such extrusion flow-promoting agent, so changes the physical character of the clay that it can be extrusion die-molded. Similarly, fibrous materials, so treated, are moldable by extrusion.

In general, thus, non-plastic materials, such as fibrous materials, shredded bagasse, excelsior, shredded straw or hay, cotton fibers, shredded wood fibers, asbestos fibers, mineral residues, fines, concentrates, non-plastic clays, oxides, etc., or any combination of them, are applicable as raw material. We may in some instances add a filler, such as wood flour or the like. In such fibrous materials, it is noticed that there can be included relatively long fibers, for instance one-eighth to one inch in length, and with the extrusion flow-promoting agent, such materials are operable through extrusion dies.

The extrusion flow-promoting agent, as pointed out, has the physical characteristic of low torque generation, e. g. under 15 pounds, at rates of rotation up to 275 R. P. M., in rotational viscosimeter tests, and preferably also with the property of non-thixotropy, or at least low thixotropy. And thus such "extrusion flow-promoting agent" as we designate it for conciseness, is a characterization of physical or mechanical property or additive element, rather than chemical. Various materials provide such properties, and notably hydrolyzed starches, as for instance alkali hydrolyzed potato starch, and cornstarch, etc., and illustrative of such are commercial products known as "tufjel," "mellogel," etc.

A settable binder may also be included with the material which is to be extrusion molded, and thus for uses where particular durability is important, the extruded product may be set or indurated. As such binder, various agents may be included, such as protein binders, soya bean flour after extraction of oil, casein glue, resin binders, synthetic resins, as phenol formaldehyde, urea formaldehyde, furfural resins, etc. Waterborne mixtures or non-aqueous mixtures are accordingly within the field of operation. And, since water, if used, may range up to around half of the total, such a molded product is finally dried. If the drying be carried on in a moist atmosphere, the product will dry evenly from interior out.

Where including a protein binder, as soy bean protein, casein, etc., it is of advantage also to include lime, preferably hydrated lime, this acting to further harden the binder. Additions of sodium silicate or waterglass are advantageous in some instances; also if a rosin solution, e. g. rosin dissolved in naphtha or gasoline or like hydrocarbon, be included, water resistance is enhanced.

As the materials and the intended usages of the products vary, it is understood that the proportions of materials employed may vary. However, the amount of extrusion flow-promoting agent is in all cases relatively small, a few per cent, $\frac{1}{2}$ of 1% giving adequate results with some materials, and in general 10% being in the upper limit. In most cases around $2\frac{1}{2}$% and 3% is a desirable optimum. The amount of binder, as for instance soya bean flour, may range from 15 to 45, and lime where used may range up to 20%, and similarly with sodium silicate where used. Rosin solution may be employed in amount of, for instance, 3 to 10%.

As an example: Shredded begasse 27 lbs. is mixed with protein binder (e. g. soya bean flour) 18 lbs., water 57 lbs., hydrolyzed potato starch (e. g. "tufjel") 3.75 lbs., lime 6 lbs., and rosin solution 6 lbs. After thorough mixing, the mass is put through an extruding machine, pug mill or other extruding means, and the extruded product is dried or set in a controlled moist atmosphere.

As another example: Three per cent of a modified starch, as for instance commercial "tufjel," together with sufficient water for tempering, is disseminated in kaolin clay, and the mass is pugged and die extruded. The same clay in its original condition is entirely inoperable by extrusion.

As another example: Water 19 parts by weight, cotton fiber 9, modified cornstarch, as for instance commercial "mellojel," 1.25, soya bean flour 6, and hydrated lime 2 parts, are thoroughly pugged and die-extruded in cross section as desired.

As another example: Shredded bagasse or wood pulp about 23%, casein or the like 16%, modified starch, as for instance commercial "tufjel" 3.5%, and lime 6%, with the balance water, are pugged and die-extruded.

This application is a continuation, in part and as to common subject matter, of our application Serial No. 494,752, filed July 14, 1943 now abandoned.

Other modes of applying the principle of the invention may be employed, change being made as regards the details described, provided the features stated in any of the following claims or the equivalent of such be employed.

We therefore particularly point out and distinctly claim as our invention:

1. In a process of molding, changing the character of a non-plastic material to render it extrudable by disseminating therein one-half to not over ten per cent of alkali-hydrolyzed starch having viscosity torque not exceeding 15 at up to 275 R. P. M. and ordinary temperature on a rotational viscosimeter, said starch being dispersed in water, and then molding the unshaped mass by forcing it through an extrusion-opening.

2. In a process of molding, changing the character of a fibrous material to render it extrudable by disseminating therein one-half to not over ten per cent of alkali-hydrolyzed starch having viscosity torque not exceeding 15 at up to 275 R. P. M. and ordinary temperature on a rotational viscosimeter, said starch being dispersed in water, and then molding the unshaped mass by forcing it through an extrusion-opening.

3. In a process of molding, changing the character of a non-plastic material to render it extrudable by disseminating therein one-half to not over ten per cent of alkali-hydrolyzed starch having viscosity torque not exceeding 15 at up to 275 R. P. M. and ordinary temperature on a rotational viscosimeter, said starch being dispersed in water, incorporating also a settable binder, and then molding the unshaped mass by forcing it through an extrusion-opening.

4. In a process of molding, changing the character of a fibrous material to render it extrudable by disseminating therein one-half to not over ten per cent of alkali-hydrolyzed starch having viscosity torque not exceeding 15 at up to 275 R. P. M. and ordinary temperature on a rotational viscosimeter, said starch being dispersed in water, incorporating also a settable binder, and then molding the unshaped mass by forcing it through an extrusion-opening.

5. In a process of molding, changing the character of a non-plastic material to render it extrudable by disseminating therein one-half to not over ten per cent... ing viscosity torque... R. P. M. and ordinary t... viscosimeter, said starch be... incorporating also soya bean flour, molding the unshaped mass by forcing it through an extrusion-opening, and heating the product.

6. In a process of molding, changing the character of bagasse to render it extrudable by disseminating therein one-half to not over ten per cent of alkali-hydrolyzed starch having viscosity torque not exceeding 15 at up to 275 R. P. M. and ordinary temperature on a rotational viscosimeter, said starch being dispersed in water, incorporating also soya bean flour, molding the unshaped mass by forcing it through an extrusion-opening, and heating the product.

7. Extrusion-molding a mass of long fibers by mixing therein water and up to five per cent of alkali-hydrolyzed starch having viscosity torque not exceeding 15 at up to 275 R. P. M. and ordinary temperature on a rotational viscosimeter, said starch being dispersed in water, and forcing the fiber mass out through a die.

8. Extrusion-molding bagasse by mixing therein water and up to five per cent of alkali-hydrolyzed starch having viscosity torque not exceeding 15 at up to 275 R. P. M. and ordinary temperature on a rotational viscosimeter, said starch being dispersed in water, and forcing the bagasse out through a die.

JOHN F. McWHORTER.
MAHLON J. RENTSCHLER.

REFERENCES CITED

The following references are of record in the file of this patent:

UNITED STATES PATENTS

| Number | Name | Date |
|---|---|---|
| 2,121,076 | Ellis | June 21, 1938 |
| 2,271,960 | Taylor | Feb. 3, 1942 |

OTHER REFERENCES

Kerr, "Chemistry and Industry of Starch," Academic Press Inc., New York, 1944, pp. 57–59 and 431.